(12) United States Patent
Zahnd (10) Patent No.: US 11,002,399 B2
(45) Date of Patent: May 11, 2021

(54) SEWER INSPECTION AND/OR MAINTENANCE SYSTEM

(71) Applicant: iPEK International GmbH, Sulzberg (DE)

(72) Inventor: Fabian Zahnd, Waltenhofen (DE)

(73) Assignee: iPEK International GmbH, Sulzberg (DE)

( * ) Notice: Subject to any disclaimer, the term of this patent is extended or adjusted under 35 U.S.C. 154(b) by 0 days.

(21) Appl. No.: 16/789,850

(22) Filed: Feb. 13, 2020

(65) Prior Publication Data

US 2020/0256502 A1   Aug. 13, 2020

(30) Foreign Application Priority Data

Feb. 13, 2019   (EP) .................................... 19156998

(51) Int. Cl.
| | | |
|---|---|---|
| *F16L 55/40* | (2006.01) | |
| *E03F 7/12* | (2006.01) | |
| *G01M 3/00* | (2006.01) | |
| *F16L 101/30* | (2006.01) | |

(52) U.S. Cl.
CPC ................ *F16L 55/40* (2013.01); *E03F 7/12* (2013.01); *G01M 3/005* (2013.01); *F16L 2101/30* (2013.01)

(58) Field of Classification Search
CPC ..... F16L 55/40; F16L 2101/30; G01M 3/005; E03F 7/12
USPC ........................................................ 73/865.8
See application file for complete search history.

(56) References Cited

U.S. PATENT DOCUMENTS

| | | |
|---|---|---|
| 5,018,545 A | 5/1991 | Wells |
| 10,180,205 B2 | 1/2019 | Nieding et al. |
| 2004/0175235 A1* | 9/2004 | Whittaker ............. F16L 55/265 405/51 |

FOREIGN PATENT DOCUMENTS

| | | |
|---|---|---|
| DE | 299 22 616 U1 | 6/2013 |
| DE | 10 2013 010 584 A1 | 12/2014 |
| EP | 0 640 821 A2 | 3/1995 |
| EP | 0 640 821 A3 | 3/1995 |
| EP | 0 911 452 A2 | 4/1999 |
| EP | 0 911 452 A3 | 3/2000 |

OTHER PUBLICATIONS

Extended European search report with the European search report or the partial European search report/ declaration of no search and the European search opinion issued by the European Patent Office for corresponding European Patent Application No. 19156998.7-1002, dated Jul. 19, 2019, with an English translation.

* cited by examiner

*Primary Examiner* — Nimeshkumar D Patel
*Assistant Examiner* — Jean F Morello
(74) *Attorney, Agent, or Firm* — Myers Wolin, LLC (57) ABSTRACT

A sewer inspection or maintenance system is provided, at least comprising a carrier system, a satellite system which is movable relative to the carrier system, and a guide device coupled to the carrier system, along which the satellite system can be guided during a movement relative to the carrier system. The guide device can be extended or unfolded or rolled out from a stowed position into at least one position of use, so that the effective length of the guide device can be increased.

11 Claims, 6 Drawing Sheets

SEWER INSPECTION AND/OR MAINTENANCE SYSTEM

CROSS REFERENCE TO RELATED APPLICATIONS

This application claims priority to European Patent Application No. EP 19 156 998.7, filed Feb. 13, 2019, the contents of which are incorporated by reference herein.

TECHNICAL FIELD

The invention relates to a sewer inspection and/or maintenance system, at least having one carrier system, a satellite system and a guide device, the guide device being provided for introducing the satellite system from a main channel into a side channel branching off from the main channel.

BACKGROUND

In the field of sewer inspection or sewer maintenance, so-called satellite systems are often used, which can be introduced from a trolley into a side channel starting from a main channel. The satellite system can be designed as a sliding camera in order to inspect the side channel. Alternatively or additionally, the sliding system can also have manipulators, for example to maintain or clean the side channel. An example of such a manipulator is a flushing device or flushing nozzle with which the side channel can be cleaned.

With larger distances between the trolley and the side channel, the trolley usually has a guide device designed as a guide tube, the guide tube having a certain length. The satellite system is pushed into the side channel from the trolley via the guide tube.

Figure 1A:
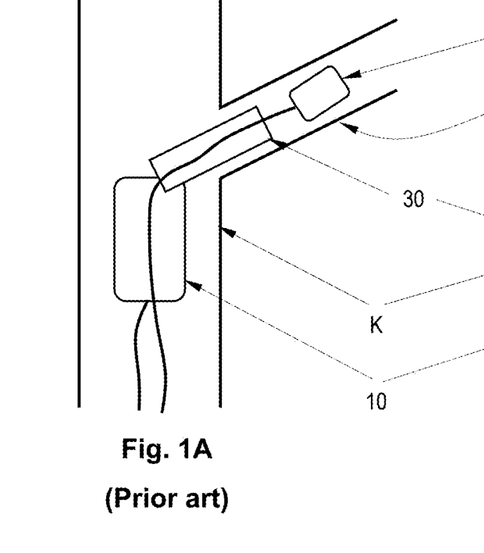
FIGS. 1A-C are schematic representations of a sewer inspection and/or maintenance system in a channel system known from the prior art.
Figure 1B:
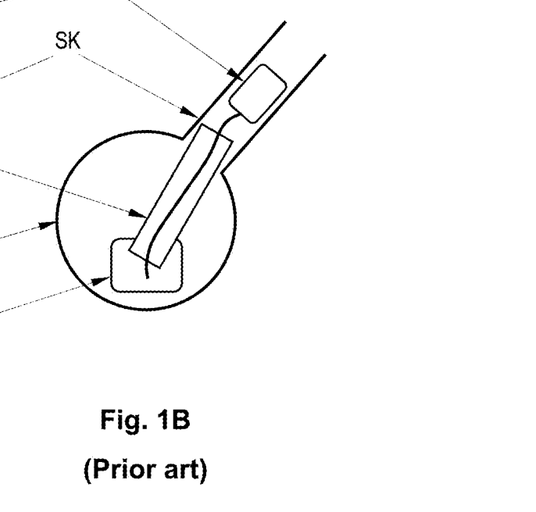
Figure 1C:
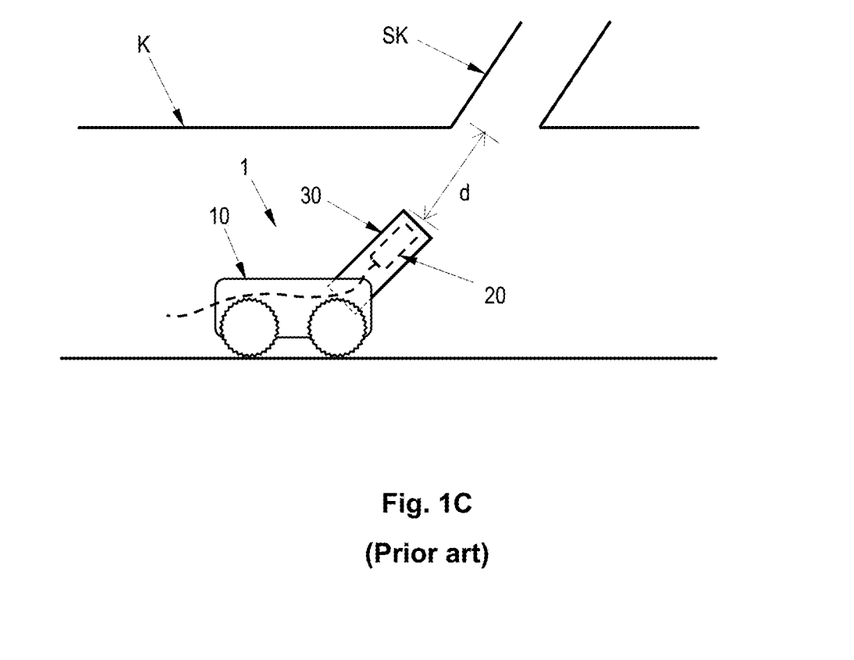

FIGS. 1A-C show a schematic illustration of a channel inspection and/or maintenance system known from the prior art, which is arranged in a main channel K.

Such a system is shown in a top view in FIG. 1A, in a front view in FIG. 1B, and in a side view within a sewer system in FIG. 1C.

The guide device 30 via which the satellite system 20 can be inserted into the side channel SK from the main channel K, is designed as a guide tube, and is arranged on the trolley 10. Here, the guide tube 30 is positioned or aligned such that the front or free end of the guide tube 30 points to the side channel SK to be inspected or slightly projects into this side channel or bears against it. The satellite system 20 is then introduced via this guide tube from the trolley 10 into the side channel SK and can then be advanced in the side channel SK for the purpose of inspection and/or maintenance.

In the case of main channels with different diameters, it is necessary in the prior art to use guide tubes or guide devices 30 of different lengths in order to ensure a safe introduction of the satellite system into a side channel branching off the main channel.

Long guide tubes cannot be used for main channels with small diameters because a long guide tube can no longer be aligned towards the side channel.

In the case of main channels with large diameters, however, short guide tubes 30, as shown in FIG. 1C, cannot be used. This is because the guide tube 30 can in fact be oriented toward the side channel SK. However, due to the distance d between the free end of the guide tube 30 and the access to the side channel SK, the satellite system 20 can no longer be introduced securely into the side channel.

Depending on the diameter of the main channel, it is therefore necessary to equip the trolley with a guide tube, the length of which is adapted to the diameter of the main channel. In the case of tapered main channels or in the case of main channels whose diameter changes, it may also be necessary to replace the guide tube during maintenance or an inspection in order to use a guide tube which is suitable for the respective channel diameter.

It is accordingly disadvantageous that a corresponding number of guide tubes must be kept available for a large number of different channel diameters in order to be able to equip a trolley with the guide tube suitable for the channel diameter.

In the case of channels with very large channel diameters, for example of two meters and more, correspondingly long guide tubes have to be arranged on the trolley. It is a disadvantage here that the trolley including the guide tube is usually too large to be brought in one piece through a manhole into the main channel. The user of the sewer inspection and/or maintenance system is thereby forced to lower the trolley and the guide tube separately from one another through the manhole into the main channel and to mount the guide tube on the trolley in the channel. For the user, this is associated with additional dangers and effort. The same problem also arises when the sewer inspection and/or maintenance system is pulled out through the manhole, i.e. before the system is pulled out, the guide tube must be separated from the trolley and the trolley and the guide tube must be pulled out separately from one another through the manhole. In addition, regulations from the area of occupational health and safety require extensive safety measures if a user has to descend into the manhole.

Figure 2:
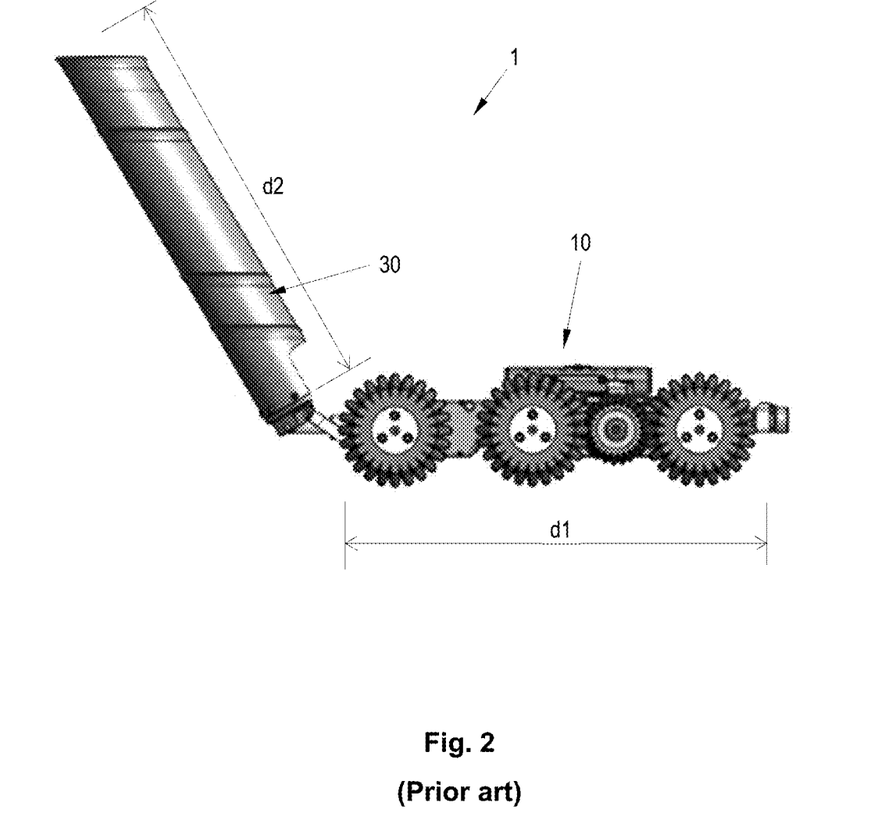
FIG. 2 is a specific sewer inspection and/or maintenance system known from the prior art.

FIG. 2 shows a specific sewer inspection and/or maintenance system 1 from iPEK International GmbH, Sulzberg, Germany, known from the prior art. The guide tube 30, which here has a length d2 of approximately 50 cm, is arranged on a trolley 10, which also has a length d1 of approximately 50 cm. This sewer inspection and/or maintenance system with the guide tube 30 shown here is only suitable for use in channels with a maximum diameter of 70 cm. For use in channels with a diameter of more than 70 cm, the trolley 10 must be equipped with a correspondingly longer guide tube.

SUMMARY

An object of the present invention is therefore to provide solutions which at least partially avoid the disadvantages mentioned in the prior art and which largely make an exchange of guide tubes for the purpose of adapting the guide tube to the channel diameter superfluous.

According to embodiments of the invention, this object is achieved with a sewer inspection and/or maintenance system according to the independent claim. Advantageous embodiments of the invention are specified in the dependent claims.

Accordingly, a sewer inspection and/or maintenance system is provided, at least comprising
  a carrier system,
  a satellite system which is movable relative to the carrier system, and
  a guide device coupled to the carrier system, along which the satellite system can be guided relative to the carrier system during a movement, wherein the guide device can be extended and/or unfolded and/or rolled out from a stowed position into at least one position of use.

Due to the extendable, unfoldable and/or roll-out design of the guide device, it can have very compact dimensions in the stowed position, so that the entire sewer inspection and/or maintenance system can be brought into the sewer completely assembled through the manhole. A separate lowering of the carrier system and guide device through the manhole into the channel is avoided.

In addition, the extendable, unfoldable and/or roll-out configuration of the guide device allows the effective length of the guide device (=length along which the satellite system can be guided) to be adapted to the diameter of the main channel, specifically after the entire inspection and/or maintenance system has been lowered into the channel through the manhole without having to change the guide device. In addition, the effective length of the guide device in the channel can be changed, so that the length of the guide device can be adapted, for example, to the changing diameter of the main channel. As a result, it is avoided overall that guide tubes or guide devices of different lengths have to be provided for different channel diameters and that depending on the channel diameter, a guide tube of corresponding length has to be mounted on the trolley or on the carrier system.

Due to the extendable, unfoldable and/or roll-out configuration of the guide device, for example a first section of the guide device can be extended and a second section of the guide device can be unfolded. In a special embodiment of the invention, the guide device can have extendable, unfoldable and roll-out sections.

A stowed position of the guide device is that position or state in which the guide device has the smallest dimensions or the smallest effective length for guiding the satellite system. Depending on the specific design of the guide device, it can also be used in the stowed position for guiding the satellite system.

A position of use of the guide device is that position or state in which the effective length along which the satellite system is guided is greater than that in the stowed position.

It is advantageous if the guide device is detachably coupled to the carrier system.

The detachable arrangement or coupling of the guide device to the carrier system means that the guide device can be removed when not in use or when the guide device is not required for inspection or maintenance. On the other hand, a guide device which is suitable for example for channel diameters up to 1.5 meters can be replaced by a guide device which is suitable for channel diameters over 1.5 meters.

The effective length of the guide device, along which the satellite system can be guided relative to the carrier system during a movement, can be increased by extending and/or unfolding and/or rolling out the guide device.

This means that by extending, by unfolding and/or by rolling out the guide device, the travel path of the satellite system can be increased relative to the guide device. For example, the travel distance is greater when the guide device is extended and/or when the guide device is extended than when the guide device is not extended or when the guide device is not unfolded.

The guide device can be reversibly extendable or can be folded out or rolled out from the stowed position into the at least one position of use.

As a result, the guide device can be brought back from the position of use into the stowed position, for example in order to be able to pull the entire inspection and/or maintenance system out of the channel through the manhole. Disassembly of the guide device from the carrier system is avoided.

In one embodiment of the invention, the guide device can be designed to be telescopic and extendable from the stowed position into the at least one position of use.

It is advantageous here if the telescopic elements of the telescopic guide device which can be displaced relative to one another are designed as solid tube profiles and/or as partial tube profiles.

Thus, the telescopic guide device can be designed either
completely as a full tube profile, or
completely as a partial tube profile, or
in sections as a full pipe profile and in sections as a partial pipe profile For example, tubes with a round, an elliptical or a rectangular profile cross section can be used as solid tube profiles of the telescopic elements.

Figure 7A:
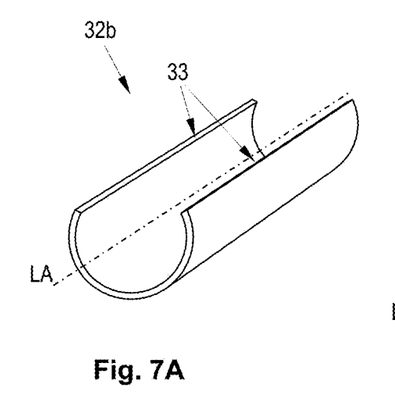
FIGS. 7A-B show two examples of a partial tube profile.
Figure 7B:
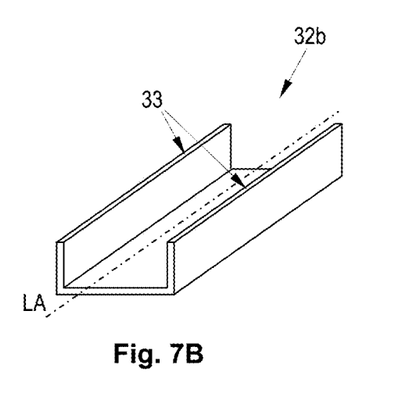

Partial tube profiles are tubes with, for example, a round, an elliptical or a rectangular profile cross-section, whereby part of the side wall of the tube is left blank between the one tube end and the other tube end, so that the remaining side wall of the tube forms two profile edges that extend from the one tube end to the other end of the pipe. These profile edges advantageously run parallel to one another and parallel to the longitudinal axis of the tube. FIGS. 7A-B show two examples of such a partial tube profile.

In one embodiment of the invention, the guide device can have a number of pivot elements which are coupled to one another in pairs and can be pivoted relative to one another, the guide device being able to be swung open from the stowed position into the at least one position of use.

The swivel elements can be configured as full pipe profiles and/or as partial pipe profiles.

In one embodiment of the invention, the guide device can comprise a spring plate that can be rolled up, wherein the spring plate can be rolled out from the stowed position into the at least one position of use.

The spring plate can be adapted to take the shape of a partial tube profile in the position of use.

The guide device can be assigned a drive unit which is adapted to extend the guide device from the stowed position into the at least one position of use or to unfold it or roll it out.

The solution according to the embodiments of the invention makes it possible, on the one hand, to use one and the same guide device for channels with different diameters. On the other hand, the guide device can be brought into a stowed position so compactly that the carrier system together with the guide device arranged thereon can be brought into the channel through a manhole and can also be removed from the channel again through the shaft.

BRIEF DESCRIPTION OF THE DRAWINGS

Further details and features of the invention will become apparent from the following description taken in conjunction with the drawings. In the drawings.

DETAILED DESCRIPTION

FIGS. 3A-E show a guide device 30 of a sewer inspection and/or maintenance system according to the invention, the guide device 30 being designed here as a telescopic guide device 31.

Figure 3A:
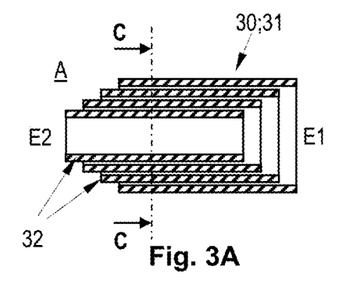
FIGS. 3A-E show a first embodiment of a guide device of a sewer inspection and/or maintenance system according to the invention.
Figures 3B, 3E:
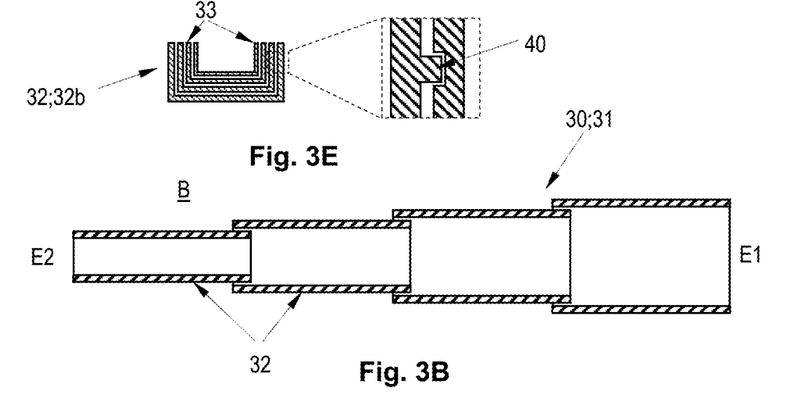

FIG. 3A shows a longitudinal section of a telescopic guide device 31 in a stowed position, in which the telescopic elements 32, which are displaceable relative to one another, are completely retracted. FIG. 3B shows the telescopic guide device 31 in a position of use in which the telescopic elements 32 which can be displaced relative to one another are fully extended.

The telescopic guide device 31 shown here has four telescopic elements 32 which can be displaced relative to one another and which are designed here as elements which can be pushed into one another. If required, however, more than four or fewer than four telescopic elements 32 which can be displaced relative to one another can also be provided. Compared to the stowed position, the effective guide length for guiding the satellite system can be increased by about four times. With a length of a telescopic element 32 of, for example, 50 centimeters, the effective length of the telescopic guide device 31 can be increased to up to approximately 2 meters, so that a channel inspection and/or maintenance system can be used in channels that have a diameter of approximately between 50 centimeters and 2 meters. A change in the guide device for channels with these diameters can be effectively avoided. Due to the compact length of a little more than half a meter of the telescopic guide device 31 in the stowed position, the entire sewer inspection and/or maintenance system can be lowered through a manhole into the channel and pulled out again through the shaft without dismantling the guide device 31. Set-up times can be reduced considerably.

Figure 3C:
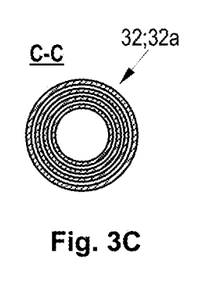

FIG. 3C shows a cross-section of the telescopic guide device 31 shown in FIG. 3A along the section axis C-C. It can be seen here that the telescopic guide device 31 consists of telescoping elements 32 which can be pushed into one another and which are each designed as a solid tube profile 32a with an approximately circular cross-section or profile cross-section. Other profile cross-sections are possible, such as elliptical or rectangular profile cross sections.

Figure 3D:
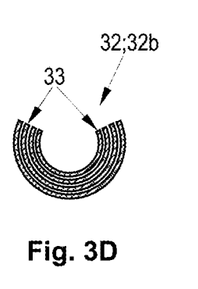

FIG. 3D shows a cross-section of a telescopic guide device, in which the telescopic elements 32, which can be pushed into one another, are designed as partial tube profiles 32b. Examples of a partial tube profile are shown with reference to FIGS. 7A-B. The partial tube profiles 32b have axially and preferably parallel profile edges 33.

A cross-section of a telescopic guide device 31 is shown in FIG. 3E, the telescopic elements 32 which can be pushed into one another being designed as partial tube profiles 32b, the profile cross sections having the shape of a U-profile.

The telescopic guide device 31 can have guide means 40, along which the individual telescopic elements are moved relative to one another when extending or retracting. For example, a tongue and groove linear guide 40 can be provided between two adjacent telescopic elements 32. With the aid of such guide means 40, on the one hand, an exact axial movement of the telescopic elements relative to one another is ensured. On the other hand, radial movement of the telescopic elements relative to one another is effectively prevented.

Such guide means 40 can also be provided in the profile cross-sections shown in FIG. 3C and in FIG. 3D.

In a special embodiment of the telescopic guide device 31, telescope elements designed as a full pipe profile 32a can be combined with telescopic elements designed as a partial pipe profile 32b, so that the guide device 31 can be designed, for example, in sections as a full pipe profile and in sections as a partial pipe profile.

Figure 4A:
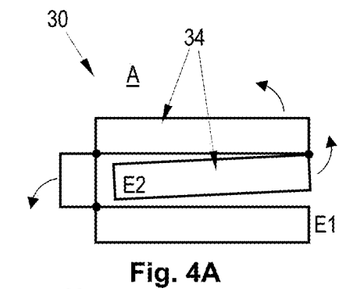
FIGS. 4A-E show a second embodiment of a guide device of a sewer inspection and/or maintenance system according to the invention.
Figure 4B:
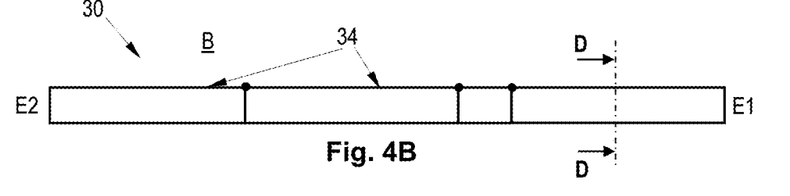

FIGS. 4A-E show a further embodiment of a guide device of a sewer inspection and/or maintenance system according to the invention. The guide device 30 is designed here as an unfoldable guide device which has a number of swivel elements 34. The swivel elements 34 are coupled in pairs so that they are pivotable relative to each other and can be folded into a compact stowed position, as shown in FIG. 4A. The guide device shown in FIG. 4A is shown in FIG. 4B in the position of use, i.e. in the opened state.

The individual swivel elements 34 of the guide device 30 can be coupled to one another, for example, by means of hinges which can be driven by adjusting means, preferably independently of one another.

In the position of use, as shown in FIG. 4B, the swivel elements 34 of the guide device 30 are preferably arranged relative to one another in such a way that the entire guide device 30 is aligned in a straight line, so that the satellite system 20 can be guided in a straight or linear manner along the guide device 30. However, it is also possible to arrange the swivel elements 34 relative to one another in such a way that the guide device 30 is slightly curved overall. The swivel elements 34 themselves can also have a slightly curved shape.

Figure 4C:
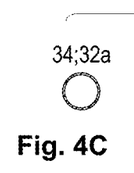
Figure 4D:
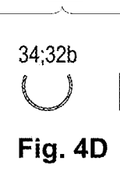
Figure 4E:
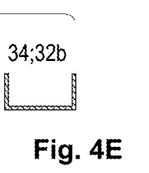

FIGS. 4C, 4D and 4E show possible cross-sections of a swivel element 34 along the section axis D-D. FIG. 4C shows a swivel element 34 with a largely circular profile cross-section. The full tube profile according to FIG. 4C can also have an elliptical, rectangular or polygonal profile cross section. A swivel element 34 is shown in FIG. 4D, which is designed as a partial tube profile 32b. A swivel element 34 with a U-shaped profile cross-section is shown in FIG. 4D.

FIGS. 5A-D show a further embodiment of a guide device 30 of a sewer inspection and/or maintenance system according to the invention. The guide device 30 here has a resilient or flexible element 35, which in the embodiment shown here is designed as a spring plate.

Figure 5A:
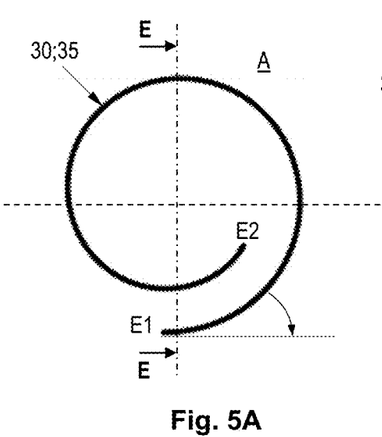
FIGS. 5A-D show a third embodiment of a guide device of a sewer inspection and/or maintenance system according to the invention.
Figure 5B:
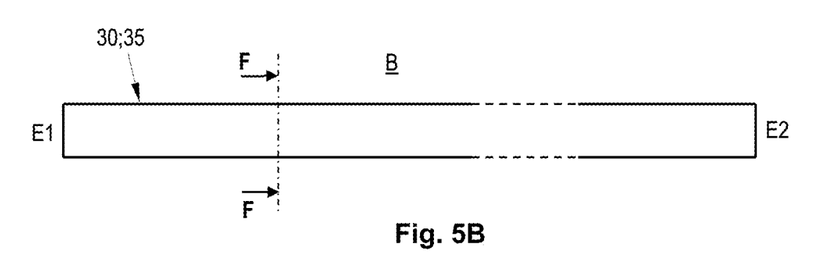

In FIG. 5A the spring plate 35 is shown in a stowed position, in which the spring plate 35 is rolled up. In FIG. 5B the spring plate 35 shown in FIG. 5A is shown in a position of use in which the spring plate 35 is fully rolled out.

In the rolled-out state, i.e. in the position of use, the spring plate 35 forms a largely straight or linear guide for the satellite system 20. However, it is also possible for the spring plate 35 to run in a slightly arc-shaped manner in the position of use, i.e. in the rolled-out state, thereby enabling the satellite system 20 to be guided in an arc along the guide device 30.

Figure 5C:
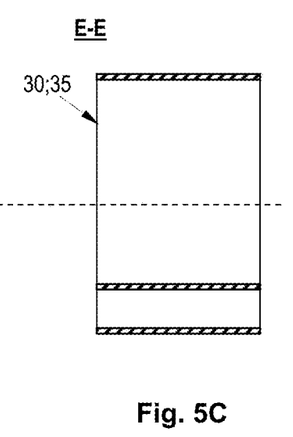
Figure 5D:
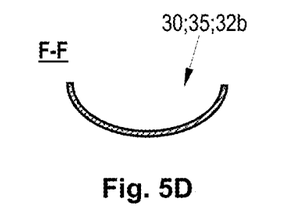

In the stowed position, i.e. in the rolled-up state, the spring plate 35 is largely flat, as can be seen in FIG. 5C, FIG. 5C showing a cross section along the section axis E-E. In the rolled-out state, i.e. in the position of use, the spring plate 35 can deform into a half-shell or a partial tube profile. A cross-section along the section axis F-F of the spring plate 35 in the rolled-out state or in the position of use is shown in FIG. 5D. The shape of the half-shell or the shape of the partial tube profile in the rolled-out state can be impressed in the spring plate 35, so that the spring plate 35 automatically assumes the shape of the half-shell or the partial tube profile when it is rolled out or after it has been rolled out.

The spring plate 35 is designed such that it can be brought back into the stowed position against its spring force, i.e. it can be rolled up.

Figure 6A:
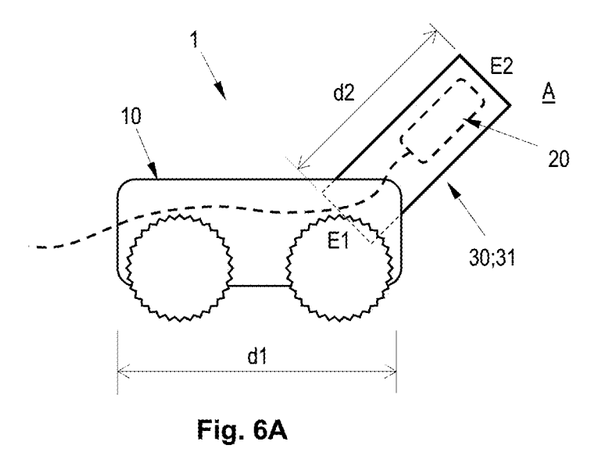
FIGS. 6A-B show a sewer inspection and/or maintenance system according to the invention with a guide device according to the invention.
Figure 6B:
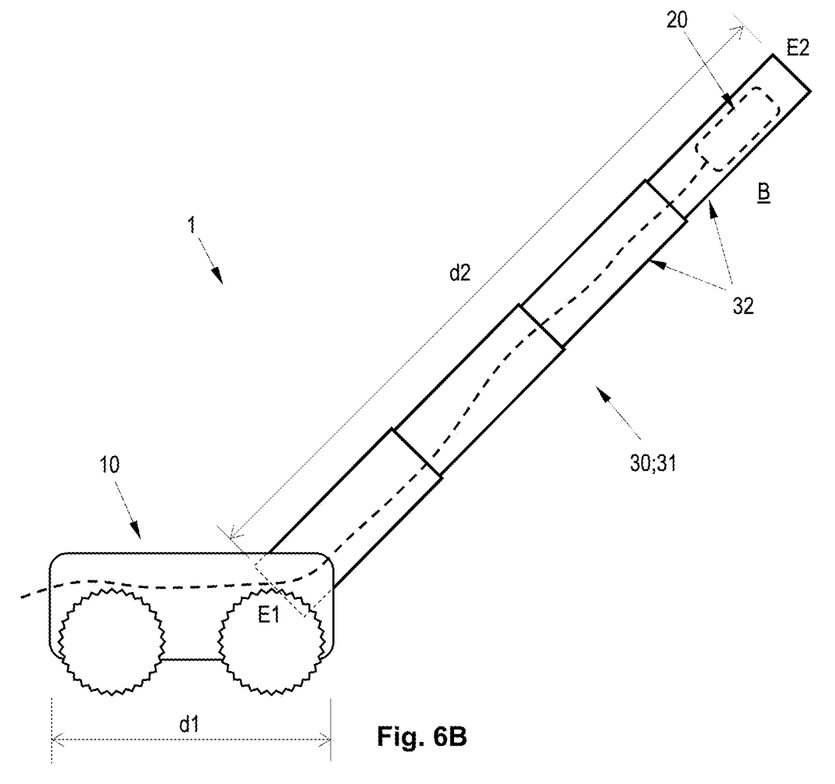

FIGS. 6A-B show a sewer inspection and/or maintenance system 1 according to the invention with a guide device 30 according to the invention arranged thereon, the guide device 30 being shown in a stowed position in FIG. 6A and the guide device 30 in a position of use in FIG. 6B.

The guide device 30 shown in FIGS. 6A-B is, for example, a telescopic guide device 31 which can be extended to increase the effective guide length.

The telescopic guide device 31 shown in FIGS. 6A-B has four telescopic elements 32 which can be pushed into one another, so that the effective guide length d2 of the telescopic guide device 31 in the position of use is approximately four times as long as the effective guide length d2 of the telescopic guide device 31 in the stowed position.

The guide device 30 is arranged with its first end E1 on the carrier system 10, preferably pivotably arranged on the carrier system 10. In the embodiment of the sewer inspection and/or maintenance system according to the invention shown in FIGS. 6A-B, the carrier system 10 is configured as a trolley.

The guide devices shown in FIGS. 3A to 5D can also be arranged with the first end E1 on the carrier system 10. These guide devices 30 can also be arranged pivotably on the carrier system.

The guide device 30 shown in FIGS. 3A-E can, however, also be arranged on the carrier system 10 with the second end E2, so that the diameter of the guide device 30 gradually increases in the position of use in the direction of the free end of the guide device.

Instead of a carrier system 10 designed as a trolley, for example a rod can also be used as the carrier system, wherein the guide device 30 can be arranged on the front end, i.e. on the free end of the rod, and can preferably be arranged pivotably.

Together with the rod, the satellite system 20 is also brought into the channel and advanced in the channel. After reaching the side channel to be inspected, the satellite system 20 can be pushed into the side channel from the rod via the guide device 30.

In the sewer inspection and/or maintenance system 1 shown above, adjusting means or drive units can be provided with which the respective guide device 30 can be brought from a stowed position into a position of use or from the position of use back into the stowed position. These adjusting means or drive units can either be arranged on the carrier system 10 or on the guide device 30 itself.

In a telescopic guide device 30 (as shown in FIGS. 3A-E, for example) or in a foldable guide device 30 (as shown in FIGS. 4A-E, for example), spindle drives or Bowden cables can be provided as adjusting means.

In the case of a telescopic guide device 30 with a circular cross-section, the telescopic elements 32 themselves can be designed as a spindle, so that a telescopic element can be displaced relative to the other telescopic element by rotating about its longitudinal axis.

In the case of a foldable guide device 30, servomotors, spring mechanisms, cable pulls or Bowden cables as well as combinations thereof are also possible as adjusting means.

In the case of a guide device 30 that can be rolled out (as shown, for example, in FIGS. 5A-D), a rolling drive can be provided as an adjusting means, for example, which pushes the guide device out of a roll-up container.

In one embodiment of the invention, the satellite system 20 itself can also be used as an adjusting means, so that moving the satellite system 20 along the guide device 30 causes the guide device 30 to extend, unfold or roll out.

In the case of a telescopic guide device, the satellite system 20 can, for example, be detachably coupled to the innermost of the telescopic elements 32 that can be pushed into one another, so that the satellite system 20 entrains the innermost of the telescopic elements 32 when it is advanced. The telescopic elements 32 can be coupled to one another in such a way that a telescopic element entrains the next largest telescopic element. After the desired guide length of the telescopic guide device 31 has been reached, the satellite system 20 can be decoupled from the innermost telescopic element, so that the satellite system 20 can be displaced relative to this telescopic element and introduced into the side channel.

In the opposite direction, i.e. when the satellite system 20 is pulled out of the side channel, the satellite system can be coupled again with the innermost telescopic element 32, so that in the further course the telescopic elements 32 are pushed into one another again and the telescopic guide device 31 is thus brought back into the stowed position. After reaching the stowed position, the satellite system can be uncoupled from the innermost telescopic element.

In the case of a foldable guide device 30 (as shown, for example, in FIGS. 4A-E), the swivel elements 34 can be assigned spring elements which hold the swivel elements in the stowed position. When the satellite system 20 is advanced, the individual swivel elements can then be opened one after the other against the spring force of the spring elements. Due to the relatively high rigidity of the cable or the rod of the satellite system, the unfolded elements are held in the unfolded state. When the satellite system is pulled out of the side channel, the unfolded elements are released one after the other and the spring force of the spring elements causes the swivel elements to be folded together again.

In a similar manner, the spring force of the spring plate 35 can also be used in the case of a guide device 30 that can be rolled out (as shown in FIGS. 5A-D). When the satellite system 20 is advanced, the spring plate is rolled out against its spring force. When the satellite system is pulled out of the side channel, the spring force of the spring plate causes the spring plate to automatically roll up and thus return to the stowed position.

FIGS. 7A-B show two examples of a telescopic element 32 designed as a partial tube profile 32b. In FIG. 7A, the partial tube profile 32b has an annular segment-shaped cross section, i.e. a section of the side wall of the tube is recessed between one end of the tube and the other end of the tube, so that the partial tube profile 32b has two profile edges 33 extending parallel to the longitudinal axis LA and parallel to one another.

In FIG. 7B a partial tube profile 32b is shown, which has an essentially U-profile-shaped cross section. This partial tube profile 32b shown in FIG. 7B also has two profile edges 33 running parallel to one another and parallel to the longitudinal axis LA.

Of course, the partial tube profiles used for a guide device 30 can also have a different profile cross-section. The only requirement is that the profile is suitable for safe guidance of the satellite system along the carrier system and that the individual elements of the guide device can be extended or unfolded and retracted or folded in the sense of the present invention.

Figure 8A:
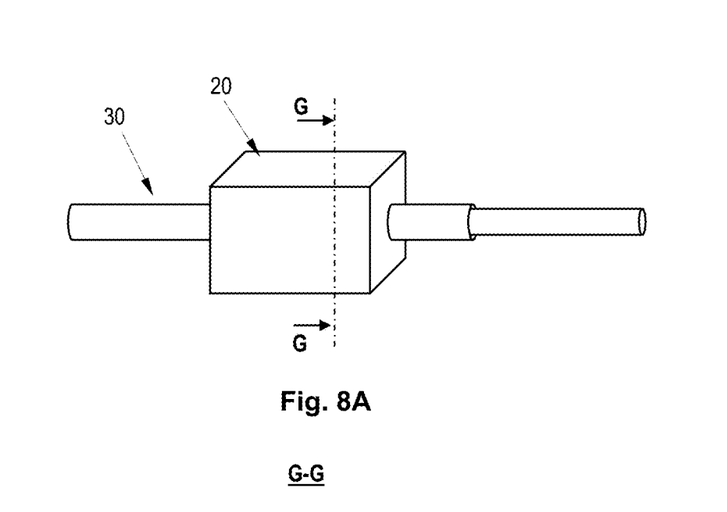
FIGS. 8A-C show another embodiment of a guide device according to the invention with a telescopic element arranged thereon.
Figure 8B:
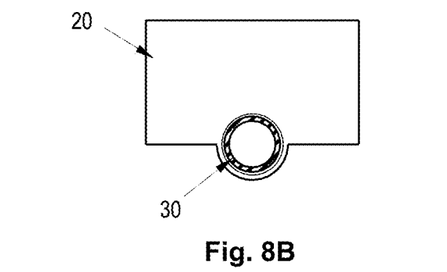
Figure 8C:
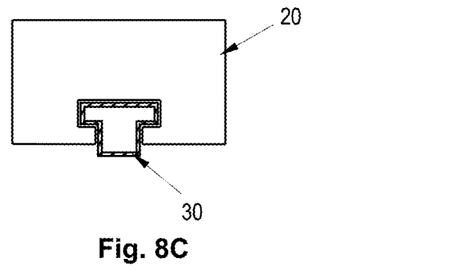

FIGS. 8A-C show a further embodiment of a guide device according to the invention with a satellite system arranged thereon, the system being shown in a perspective view in FIG. 8A and two possible cross-sections of the system in being shown in FIGS. 8B and 8C.

The guide device 30 shown in FIGS. 8A-C is a telescopic guide device with telescopic elements that can be displaced relative to one another, as shown for example in FIGS. 3A-E. In FIG. 8B, the guide device 30 has a round cross-section, while the guide device 30 shown in FIG. 8C has a T-shaped cross-section. In principle, the guide device can have different cross-sections, it only being necessary to ensure that the individual telescopic elements can be displaced relative to one another. In one embodiment of the invention, the telescopic elements, which are displaceable relative to one another, can be pushed into one another.

In the embodiment shown in FIGS. 8A-C, the guide device 30 is encompassed by the satellite system 20 (FIG. 8B) or partially surrounded (FIG. 8C), so that the satellite system 20 can be moved along the guide device 30.

In the system shown in FIGS. 8A-C, the guide device 30 may be configured as a fold-out or roll-out guide device as shown in FIGS. 4A-E and FIGS. 5A-D. After the guide device has been unfolded or rolled out, the satellite system 20, which completely or partially encompasses the guide device 30, can be moved along the guide device.

REFERENCE NUMERALS

1 Sewer inspection and/or maintenance system
10 Carrier system (e.g. trolley) of the sewer inspection and/or maintenance system 1
20 Satellite system of the sewer inspection and/or maintenance system 1
30 Guide device of the sewer inspection and/or maintenance system 1
31 Telescopic guide device, e.g. telescopic tube
32 Telescopic elements of the telescopic guide device 31 which can be pushed into one another
32a Full tube profile
32b Partial tube profile, e.g. half tube profile
33 (Axially and preferably parallel) profile edges of the partial tube profile 32b
3 Swivel elements
35 Spring plate
40 Guide means, e.g. tongue and groove linear guide
A Stowage position of the guide device 30
B Position of use of the guide device 30
d Distance between the free end of the guide device 30 and the access to the side channel SK
d1 Length of the carrier system 10
d2 Length of the guide device 30
E1 First end of the guide device 30, at which the guide device is fastened (for example detachably) to the carrier system
E2 Second, free end of the guide device 30

K Channel or main channel
LA Longitudinal axis
SK Side channel

The invention claimed is:

1. A sewer inspection and/or maintenance system (1), comprising:
    a carrier system (10),
    a satellite system (20) which is movable relative to the carrier system, and
    a guide device (30) coupled to the carrier system (10), along which the satellite system (20) is configured to be guided during a movement relative to the carrier system (10),
    wherein the guide device (30) is configured to be extended or unfolded or rolled out from a stowed position (A) into at least one use position (B).

2. The system of claim 1, wherein the guide device (30) is detachably coupled to the carrier system (10).

3. The system of claim 1, wherein the effective length of the guide device (30), along which the satellite system (20) is configured to be guided during a movement relative to the carrier system (10), can be enlarged by extending and/or unfolding and/or rolling out the guide device (30).

4. The system of claim 1, wherein the guide device (30) is reversibly extendable from the stowed position (A) into the at least one use position (B) or is configured to be unfolded or rolled out.

5. The system of claim 1, wherein the guide device (30) is designed to be telescopic and is configured to be extended from the stowed position (A) into the at least one use position (B).

6. The system of claim 5, wherein telescopic elements (32) of the telescopic guide device (31) which is configured to be displaced relative to one another are designed as solid tube profiles (32a) or as partial tube profiles (32b).

7. The system of claim 1, wherein the guide device has a number of swivel elements (34) which are coupled in pairs and are pivotable relative to one another, wherein the guide device is configured to be unfolded from the stowed position (A) to the at least one position of use (B).

8. The system of claim 7, wherein the swivel elements (34) are designed as solid tube profiles (32a) or as partial tube profiles (32b).

9. The system of claim 1, wherein the guide device comprises a roll-up spring plate (35), the spring plate being able to be rolled out from the stowed position (A) into the at least one use position (B).

10. The system of claim 9, wherein the spring plate (35) is adapted to assume the shape of a partial tube profile (32b) in the position of use (B).

11. The system of claim 1, wherein the guide device is assigned a drive unit which is adapted to extend or unfold or roll out the guide device (30) from the stowed position (A) into the at least one position of use (B).

* * * * *